United States Patent [19]

Kittel

[11] Patent Number: 4,583,217
[45] Date of Patent: Apr. 15, 1986

[54] METHOD OF ACCESS CONTROL IN A COMMUNICATION SYSTEM USING ORTHOGONAL FUNCTIONS

[75] Inventor: Ludwig Kittel, Heroldsberg, Fed. Rep. of Germany

[73] Assignee: U.S. Philips Corporation, New York, N.Y.

[21] Appl. No.: 520,383

[22] Filed: Aug. 4, 1983

[30] Foreign Application Priority Data

Aug. 20, 1982 [DE] Fed. Rep. of Germany ....... 3230999

[51] Int. Cl.$^4$ ........................... H04J 3/17; H04L 5/06
[52] U.S. Cl. ........................................ 370/29; 370/85; 370/94; 370/89; 370/95; 340/825.71; 340/825.76
[58] Field of Search ..................... 370/21, 22, 29, 104, 370/85, 94, 94 U, 95, 89, 50; 455/32, 34, 5; 340/825.76, 825.7, 825.3, 825.58, 825.33

[56] References Cited

U.S. PATENT DOCUMENTS 2,658,189  11/1953  Lovell .................................. 370/21
3,099,795  7/1963   Frank .................................. 340/825.7
3,287,699  11/1966  Malone ................................ 455/36

Primary Examiner—Joseph A. Orsino, Jr.
Assistant Examiner—Timothy K. Greer
Attorney, Agent, or Firm—Thomas A. Briody; William J. Streeter

[57] ABSTRACT

In a communication system having a plurality of mutually independent subscriber stations, these stations seize a common duplex transmission channel for establishing a connection in accordance with a multiple-access method. To prevent simultaneous access and the resultant access destruction and also in the case of frequent access destruction of the blocking of the common duplex transmission channel, each transmission station, to initiate a transmission therefrom, seizes the duplex transmission channel by means of a signalling character. The signalling character is transmitted by the subscriber station during a time slot allocated for that purpose. To distinguish between reporting subscriber stations, a pulse function from a system of orthogonal or substantially orthogonal pulse functions is used as an identification character. The subscriber stations occupy the duplex transmission channel in time slots authorized for access, uncoordinated in time, with, for example, a randomly selected orthogonal pulse function.

6 Claims, 2 Drawing Figures

METHOD OF ACCESS CONTROL IN A COMMUNICATION SYSTEM USING ORTHOGONAL FUNCTIONS

BACKGROUND OF THE INVENTION

The invention relates to a method of access control in a communication system comprising a plurality of mutually independent subscriber stations, in which each subscriber station seizes a common duplex transmission channel for establishing a connection in accordance with a multiple-access method. Each subscriber station, to initiate a transmission from that station, inserts a signalling signal into a time slot of the duplex transmission channel and in response thereto is invited by a central unit of the communication system to identify itself fully.

Such an access method in a radio transmission system has already been proposed (P 31 33 347.8). The duplex transmission channel of the radio transmission system is divided into time slots in the forward and the return directions. Each time slot available for free access is subdivided into a plurality of short, so-called call slots (for example into eight call slots). The free access of a subscriber station to the duplex transmission channel is not effected with a complete identification, but by means of a signal of a significantly shorter duration, a so-called signalling short-duration signal, transmitted in one of the call slots. On receipt of a signalling short-duration signal, the central unit requests the relevant subscriber station to identify itself fully. The number of the call slot through which the signalling short-duration signal is transmitted is used in the central unit as an identification to distinguish between the subscriber stations which during a predetermined period have actually accessed the channel by means of their signalling short-duration signals. For transmitting the signalling short-duration signal which all the subscriber stations have in common, the subscriber stations can select one of the short call slots from a plurality of available call slots. The duration of a call slot is at least equal to the duration of the signalling short-duration signal, which duration is the same for all the subscriber stations. Selecting a call slot or the exact moment for transmitting the signalling short-duration signal in one of the call slots may occur at random.

When the central unit has recognized the signalling short-duration signal with adequate receiving quality in one of the call slots, it transmits a request for full identification to the subscriber station which is provisionally indicated by the number of the call slot. The request for full identification in an associated time slot excludes all the further subscriber stations from access.

As can be seen from the above-described embodiments of the proposed radio transmission system (P 31 33 347.8) the transmission of the signalling short-duration signals which are common to all the subscriber stations is effected in time-spaced, short call slots, the number of the selected call slot distinguishing the transmitting subscriber station from other subscriber stations. If two subscriber stations report in the same call slot, they cannot be distinguished from each other by the central unit.

SUMMARY OF THE INVENTION

The invention has for its object to utilize the overall time slot available for occupation upon establishment of a connection for the simultaneous transmission of identification characters, which can be separated from each other on reception.

According to the invention, this object is accomplished by way of an identification character for identifying the reporting subscriber station. A pulse function from a system of orthogonal or substantially orthogonal pulse functions is used, which, by mutual agreement, are recognized by both the central unit and the subscriber stations. The subscriber stations seize, without being coordinated in time, the time slots authorized for access by means of one of the orthogonal pulse functions.

It is possible to realize low-cost orthogonal pulse functions by using analog and digital circuit techniques. The signal analyzers employed for recognizing orthogonal pulse functions are of a simple structure. Transmitting the orthogonal pulse functions is effected during the total duration of the authorized time slot and is no longer limited to the exceptional case in which a fixed character is transmitted in one of the different call slots. Disturbances in the access operations, due to the transmission of complete, but inseparable identifications during simultaneous transmissions, can be prevented.

In an advantageous embodiment of the invention functions which are commonly referred to as orthogonal SIN-COS-functions or WALSH-functions or HAAR-functions or SLANT-functions, are used as the orthogonal pulse functions.

Such orthogonal pulse functions and their evaluation are known (NTG, Signalverarbeitung, Proceedings of the symposium held in Erlangen from Apr. 4–6, 1973 under the same name, published by W. Schüssler, a paper on signal theory by Hans Dieter Lüke). When such orthogonal pulse functions are employed, according to the invention, as signalling signals, simultaneous access without mutual access disturbances are rendered possible. In the subscriber stations, the orthogonal pulse functions are selected at random, so as to reduce the probability of mutual disturbances as a result of identical transmitted, orthogonal pulse functions.

The invention will now be described and explained in greater detail with reference to its use in a radio-telephone service.

DESCRIPTION OF THE PREFERRED EMBODIMENT

Figure 1:
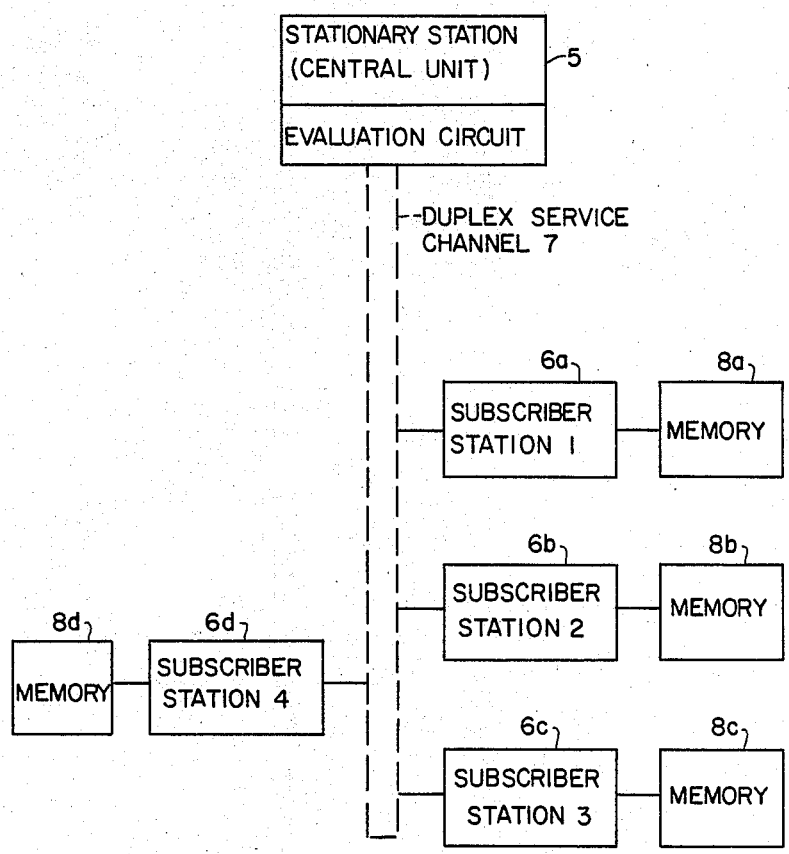
FIG. 1 is a block diagram of the communication system implementing the method of the present invention.

In a radio-telephone service, stationary transmitting stations (the central units) are geometrically arranged in accordance with a cell system. One such central unit 5 and associated subscriber stations 6a–6d are shown in FIG. 1. A plurality of duplex transmission channels, commonly referred to as radio channels, are allocated to each individual stationary transmitting station. To control the system functions, (signalling) at least one channel, the so-called service channel, is used. Signalling includes, for example, the transmission of dialing information in the build-up of calls from and to mobile subscriber stations 6a–6d of the radio communication service. Each service channel 7 is sub-divided in both transmission directions, that is to say in the forward and the return direction, into a sequence of time slots of equal lengths. The build-up of calls is effected by the service channel 7. The stationary radio (central unit) station 5 continuously transmits reports of a fixed time duration in the return direction. Each report comprises a flag, which gives information about the use of an associated time slot of the forward direction. The flag may signify authorization for free access or an inhibition for free access of mobile subscriber stations 6d–6d by means of signalling characters in the associated time slot. In addition, the flag may also signify a request for full identification in the associated time slot for each mobile subscriber station which has seized the channel by means of a signalling character.

If a mobile subscriber station 6a–6d wants access to the service channel, it first waits for an enable signal for the free access to a time slot in the forward direction. The mobile subscriber station 6a–6d selects at random one of the orthogonal pulse functions, files the "number" of the orthogonal pulse function in a memory store 8 and transmits the selected orthogonal pulse function in the released time slot. The subscriber station 6a identified by the pulse function is known to the stationary radio station, central unit 5 in so far that it can be distinguished from other reporting subscriber stations by the "number" of the orthogonal pulse function employed. The stationary radio stations transmits a flag which comprises the "number" of the selected pulse function, as a result for full identification and reserves a time slot, which is unambiguously associated with this flag, for the requested, mobile subscriber station a. The mobile subscriber station a recognizes the request for full identification by comparing the flag with the stored "number". The mobile subscriber station a transmits its full identification, and also the type of dialogue it wants to have with the stationary radio station, in the associated time slot.

The evaluation of orthogonal pulse functions in the stationary radio station and also the production of orthogonal or substantially orthogonal pulse functions in the mobile subscriber station a is effected according to mathematical theory. The continuous analysis of the orthogonal pulse functions utilized in the message transmission system is effected during a sequence of time intervals. The time limitation in the analysis results from the properties of the orthogonal pulse functions used in the message transmission system.

The principle of the analysis of the orthogonal pulse function in the stationary central unit radio station 5 must be further explained when SIN-COS-functions are used. The drawing shows schematically an embodiment which in a simple way explains the basic principle for an evaluation circuit of orthogonal pulse functions.

Figure 2:
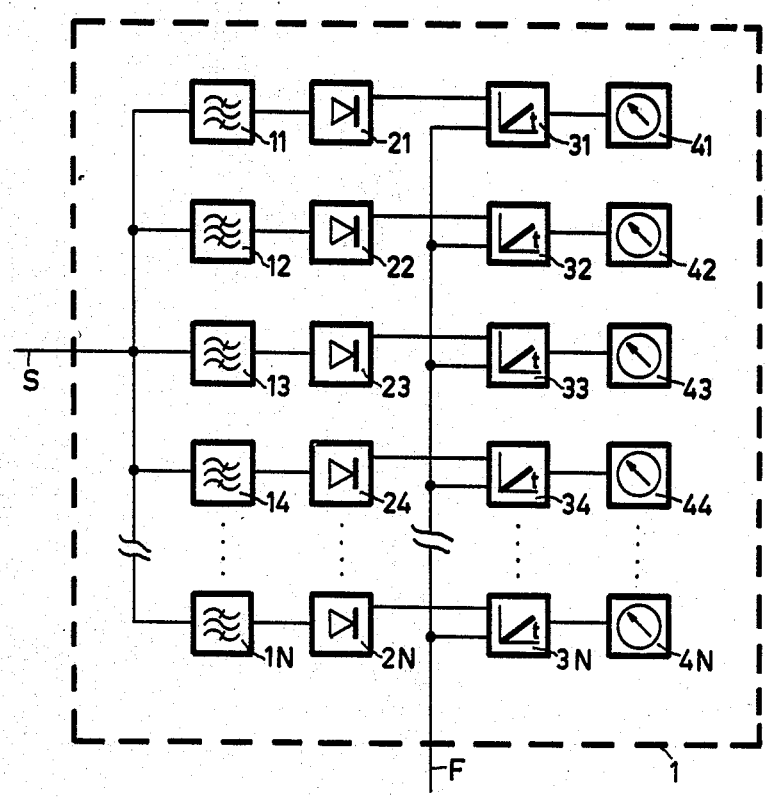
FIG. 2 is a block diagram of the evaluation circuit utilized in the central unit.

For a provisional identification of the reporting subscriber station, N different frequencies $f_1, \ldots, f_N$ are available as identifying characteristics. The determination which one of the frequencies $f_1, \ldots f_N$ are transmitted during a time slot available for free access, can, for example, be effected by means of the evaluation circuit 1 shown in FIG. 2, to which an input signal S to be evaluated is applied. The evaluation circuit 1 comprises, arranged in succession, the following components: a bank of filters consisting of N filters $11, \ldots, 1N$ tuned to the frequencies $f_1, \ldots f_N$, rectifiers $21, \ldots, 2N$, integrators $31, \ldots 3N$ and indicators $41, \ldots 4N$. During the duration of a time slot in which the frequencies $f_1, \ldots, f_N$ from subscriber stations are transmitted, the integrators $31, \ldots 3N$ add together the rectified signals from the filters $11, \ldots 1N$, which are tuned to the frequencies $f_1, \ldots f_N$. If the accumulated, rectified signal exceeds an adjustable indicator threshold then the stationary radio station decides to transmit the associated frequencies. When the indicator threshold is chosen high enough it is at the same time ensured that noise is not interpreted as an access signal and that subscriber stations which report at a very low transmission level are excluded from an allocation of time slots for the establishment of a connection. Release of the integrators $31, \ldots, 3N$ for the duration of a time slot is controlled by an enable signal F. This enable signal is produced by a central control unit, not shown in the drawing, of the stationary radio station.

When several subscriber stations with pulse functions simultaneously seize the released time slot, then only that subscriber station whose pulse function is received with the highest receiving field strength can be requested to fully identify itself. In addition, the temporary occurrence of pulse functions of the central unit can be used to measure the signal time delay between mobile subscriber stations and stationary radio stations. For subscriber stations which at the moment the released time slot is seized are in a location which from a radio-geographical point of view is very advantageous, for example on top of a mountain, it can be expected that because of its travel down-hill a fast decrease of the receiving field strength occurs in the receiving stationary radio station. By combining during the evaluation the field strength and time delay measurements it is possible to have the allocation of free time slots for the establishment of a connection also dependent on the geographical position of the subscriber stations. It is alternatively possible to allocate the released time slot to a subscriber station which is near to the receiving stationary radio station, also in the event of a lower receiving field strength.

What is claimed is:

1. In a time division multiplex system having a common duplex transmission channel divided into a plurality of time slots among a plurality of independent subscriber stations, a method for allocating access of said time slots among said stations comprising:

transmitting from each of said stations desiring access to the transmission channel during one of said time slots a substantially orthogonal pulse function signal identifying said desiring access station;

receiving at a central station connected to said duplex transmission channel said orthogonal pulse function signal;

distinguishing the subscriber station initiating said orthogonal pulse function from other stations by determining the frequency of said orthogonal pulse;

transmitting from said central station over one of said time slots a request flag to said identified subscriber station to more completely identify itself, said request flag comprising the identity of the received orthogonal pulse function; and receiving at said subscriber station said transmitted request from said central station, and transmitting in a time slot a complete identification of said subcriber station whereby said central station can fully identify said subscriber station and allocate a time slot for said subscriber station.

2. The method of claim 1 wherein said stations desiring access transmit said orthogonal pulse function during a time slot containing a flag indicating a free state for each said time slot.

3. The method of claim 1 wherein said desiring station selects said substantially orthogonal pulse function at random from a plurality of orthogonal pulse functions, and identifies said transmitted orthogonal pulse by a unique number;

said desiring station storing said unique number, and compares said stored unique number with a flag transmitted by said central station; and said desiring station transmitting its complete identity during a time slot associated with said flag when said flag equals said stored number.

4. A method as claimed in claim 1, wherein orthogonal SIN-COS-functions or WALSH-functions or HAAR-functions or SLANT-functions are used as the orthogonal pulse functions.

5. A method as claimed in claim 1, wherein in the event in which subscriber stations simultaneously seize a time slot authorized for access by means of orthogonal pulse functions only the station having the highest receiving field strength is requested by said central station to fully identify itself.

6. A method as claimed in claim 5, wherein the temporary occurrence of received pulse functions in the central station are used to determine the time delay between moving subscriber stations and stationary radio stations.

* * * * *